United States Patent [19]

Oizumi et al.

[11] Patent Number: 4,957,356

[45] Date of Patent: Sep. 18, 1990

[54] FINDER DEVICE

[75] Inventors: Kouji Oizumi; Takashi Matsushita, both of Kanagawa, Japan

[73] Assignee: Canon Kabushiki Kaisha, Tokyo, Japan

[21] Appl. No.: 180,451

[22] Filed: Apr. 12, 1988

[30] Foreign Application Priority Data

Apr. 20, 1987 [JP] Japan .................................. 62-097188
Apr. 20, 1987 [JP] Japan ........................... 62-059644[U]
Apr. 20, 1987 [JP] Japan ........................... 62-059645[U]
Aug. 21, 1987 [JP] Japan .................................. 62-208610
Aug. 21, 1987 [JP] Japan ........................... 62-127880[U]
Aug. 21, 1987 [JP] Japan ........................... 62-127881[U]
Aug. 21, 1987 [JP] Japan ........................... 62-127882[U]
Aug. 21, 1987 [JP] Japan ........................... 62-127883[U]

[51] Int. Cl.$^5$ .......................................... C02B 17/00
[52] U.S. Cl. .................................. 350/574; 350/541; 354/224; 354/225
[58] Field of Search .............. 350/286, 287, 541, 574, 350/452, 559; 354/155, 224, 225

[56] References Cited

U.S. PATENT DOCUMENTS

| 3,815,149 | 6/1974 | Ishihara | 354/224 |
| 4,170,401 | 10/1979 | Yoder, Jr. et al. | 350/174 |
| 4,279,489 | 7/1981 | Shono et al. | 354/155 |
| 4,309,078 | 1/1982 | Hara et al. | 350/286 |
| 4,697,882 | 10/1987 | Sato et al. | 350/287 |
| 4,775,229 | 10/1988 | Ichihara et al. | 350/452 |

Primary Examiner—Bruce Y. Arnold
Assistant Examiner—Jay Ryan
Attorney, Agent, or Firm—Fitzpatrick, Cella, Harper & Scinto

[57] ABSTRACT

A finder device capable of forming an erecting non-reverse image to be observed at either of the waist level and the eye level, wherein when used as the waist-level finder, the photographer, while taking his eye at a good distance from the finder, can observe the image of an object to be photographed.

12 Claims, 10 Drawing Sheets

FIG.1 PRIOR ART
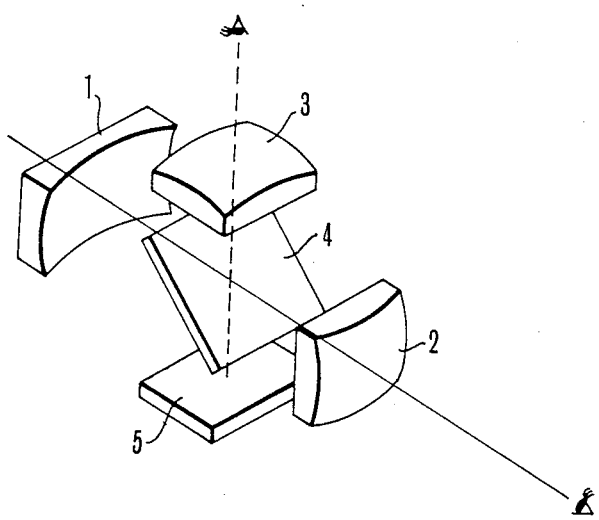
FIG.2(A) PRIOR ART
FIG.2(B) PRIOR ART
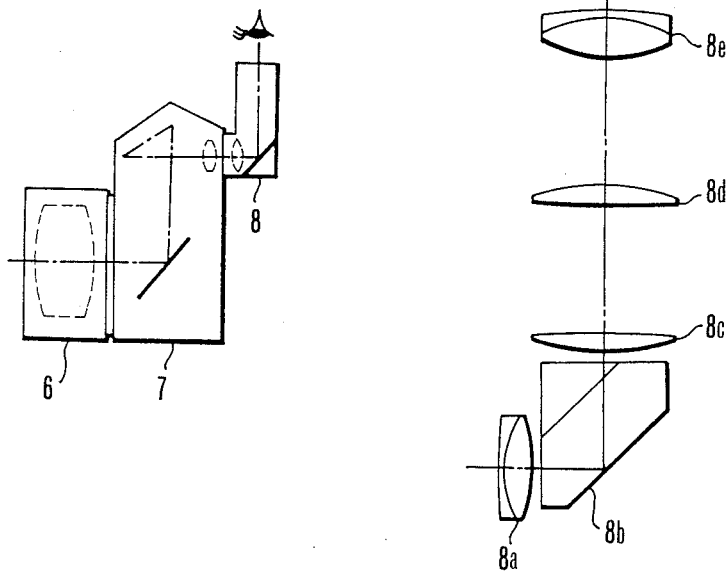

FINDER DEVICE

Background of the Invention

1. Field of the Invention

This invention relates to finder systems and, more particularly, to a finder system capable of being selectively used at the user's waist and eye levels.

2. Description of the Related Art

From the past, finder systems capable of observing an erect non-reverse image in either of the eye-level and waist-level settings are known.

For example, the photographic lens and the finder system are constructed separately from each other and, nevertheless, the finder system can operate with the selection of the eye-level and waist-level modes, both of which are capable of observing an erect non-reverse image. An example of such a system is disclosed in Japanese Patent Publication No. Sho 59-110989. The technique of using the apparatus disclosed in this document is shown in FIG. 1, where the eye-level finder system is constructed in principle with an objective lens 1 and an eyepiece lens 2 for eye-level observation in the form of a convex lens. The waist-level finder system is constructed in such a way that a half-reflection mirror 4 is arranged in the optical path of the eye-level finder, and the reflected light from this half-reflection mirror 5 is received by a total reflection mirror 5 and further an eyepiece lens 3 for waist-level observation, being directed to the waist level of the photographer.

However, because the half-reflection mirror 4 is used in splitting the light beam for eye level and waist level viewing, there is a problem that both finder systems become dark.

Meanwhile, there is a finder device which when attached to the rear of the eyepiece lens of the single lens reflex camera makes it possible for the photographer to observe an erect non-reverse image at the waist level. In FIG. 2(A) there is shown a sectional view concerning this finder device. An interchangeable lens 6 including a photographic lens, a camera body 7 including a quick return mirror and a pentagonal roof prism, and a waist level attachment 8 of the finder are arranged on a common optical axis of the finder in this order from the front. FIG. 2(B) is a longitudinal section view of the above-described waist level attachment 8, comprising an image forming lens 8a, a prism 8b having roof faces, two condenser lenses 8c and 8d for playing a role of collecting light, and an eyepiece lens 8e. Reference character "e" represents the eye point. It should be noted that the two condenser lenses 8c and 8d are not disposed at an image surface of the image forming lens 8a. The image forming lens 8a focuses an image at an intermediate position in the space between the condenser lenses 8c and 8d.

However, the above-described finder device because of the necessity of attaching and detaching it to and from the camera was troublesome in changing over between the waist-level and eye-level observation modes.

As another related art there is Japanese Laid-Open Patent Application No. Sho 50-75426.

Summary of the Invention

A first object of the invention is to provide a finder device having waist-level and eye-level systems both capable of forming an erect non-reverse image to be observed.

A second object of the invention is to achieve a minimization of the size of the finder device.

A third object is to make it possible to quickly and easily change over between the observation modes at the waist and eye levels.

A fourth object is to provide a finder device with which a user may view an image in a comfortable posture, that is, at the distant eye point position.

Further objects will become apparent from the following description taken in conjunction with the drawings.

Brief Description of the Drawings

FIG. 1 illustrates a conventional example of the finder device.

FIGS. 2(A) and 2(B) illustrate another conventional example of the finder device.

Detailed Description of the Preferred Embodiments

Figure 3A:
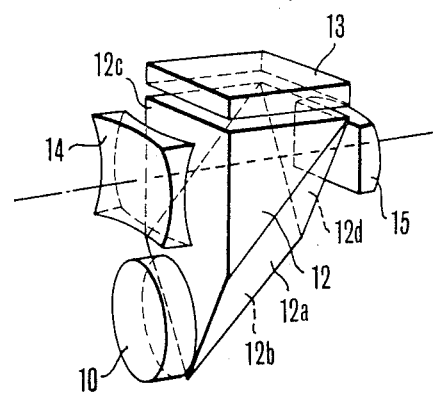
FIG. 3(A), 3(B) and 3(C) are views of a first embodiment of a finder device according to the invention.
Figure 3B:
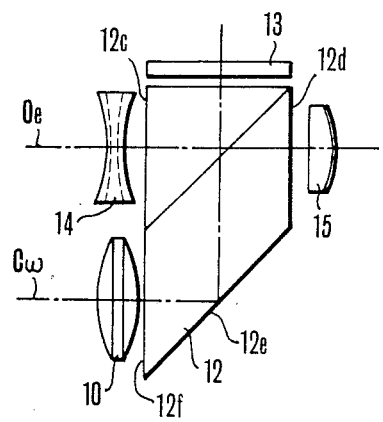
Figure 3C:
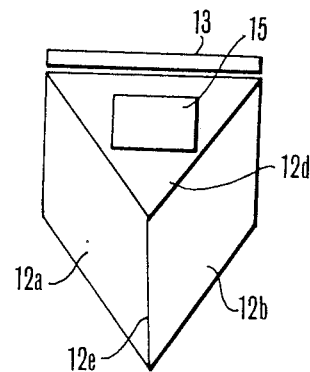

FIGS. 3(A), 3(B) and 3(C) illustrate, as the first embodiment of the invention, the fundamental structure of its finder system, FIG. 3(A) being a perspective view, FIG. 3(B) being a side elevational view and FIG. 3(C) being a back view. An objective lens unit 10 for waist observation is positioned in front of an entrance face 12f of a prism 12 having roof faces 12a and 12b. The prism 12 has also those faces 12c, 12d which cut an optical axis Oe of another objective lens unit 14 perpendicularly. By the roof faces 12a and 12b of this prism 12, an optical axis Ow of the objective lens unit 10 is bent 90° upward, reaching a focusing screen 13. The second objective lens unit 14 and an eyepiece lens unit 15 for eye-level finder are arranged respectively in front of the face 12c of the roof prism 12 and in rear of the face 12d.

With the construction and arrangement described above, when in the waist-level finder, the light from the objective lens unit 10 enters the roof type prism 12, then reflected by the roof faces 12a and 12b, and then goes upward to the focusing screen 13 where it is focused as an erect non-reverse image. The photographer observes this image on the focusing screen 13 by keeping his eye away therefrom, when he can comfortably enjoy a view of the field of the finder at the waist level. It should be noted that in this embodiment the entrance face 12f of the prism 12 is made in a convex form toward the front to bear its share of the image forming function.

Meanwhile, the eye-level finder system is constructed in the reverse-Galilean form by the objective lens unit 14 and the eyepiece unit 15. At this time, as the optical path of the prism 12 for forming the reverse-Galilean finder, by effectively utilizing the above-described face 12d formed to a triangular shape as shown in FIG. 3(C), an increase in the space efficiency is achieved.

Also, when the eye-level finder system and the waist-level finder system are considered as a whole, their optical paths each can be shortened by using one prism. This leads to a possibility of forming a high magnification finder.

It should be noted that, while in the above embodiment, a focusing screen is disposed near the image surface, a condenser lens may be disposed at such a position to efficiently collect light at the distant eye point position.

In the longitudinal section view of FIG. 4 there is shown an optics of the finder of the invention for numerical examples to be described later. In the figure, lenses 10a and 10b constitute the objective lens unit 10 for waist-level observation. The roof prism 12 has its entrance face 12f formed to a lens surface, its exit face 12g formed to a matted Fresnel surface in unison with the body thereof. A Fresnel plate (condenser lens unit) 13 is positioned with its Fresnel center off-set from the center (optical axis) of the prism 12 to the right as viewed in the figure. Rays of light entering through the objective lens unit 10 focus an erect non-reverse image on the Fresnel mat surface 12g. That image is collected with high efficiency by the Fresnel surface 12g and observed by the photographer looking through the Fresnel plate 13. The off-setting of the center of the Fresnel plate 13 from the optical axis Ow of the objective lens unit 10 allows the photographer to view the image at the waist level without the need to bring his eye right above the camera, giving an advantage that the camera is easy to hold. It should be noted that the off-setting amount of the Fresnel plate 13 may be made manually adjustable. Also, the objective lens unit 14, the prism 12 and the eyepiece lens unit 15 form an Albada finder which enables shots to be taken at the eye-level. For this purpose, it is constructed with an objective lens 14a of negative power, a frame image reflection mirror 14b, a frame mask 15a and an eyepiece 15b. That surface of the frame image reflection mirror 14b which faces to the eyepiece lens 15b side is half-mirrored so that a viewfield frame on the frame mask 15a can be observed. Reference numeral 20 identifies a photographic lens. Reference character F identifies a film surface.

Figure 5:
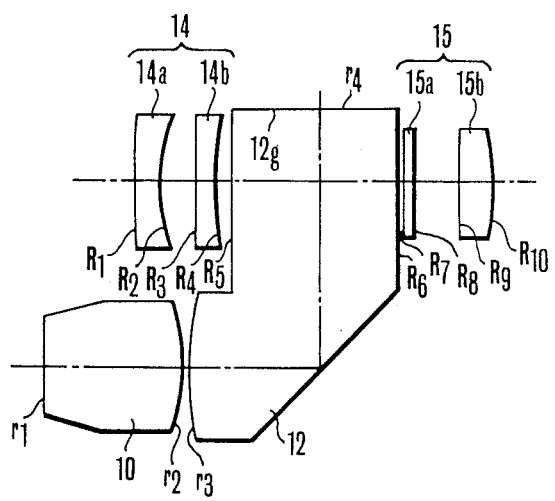
FIG. 5 is a sectional view of a third embodiment of the finder device according to the invention.

Another embodiment is shown in the sectional view of FIG. 5. Even in this case, the image by the objective lens unit 10 is focused in erect non-reverse fashion on the upper face 12g of the roof prism 12 which is also a Fresnel mat surface.

Also, the center of the Fresnel surface 12g is made off-set toward the eyepiece lens 15b of the eye-level portion, so that when holding the camera the photographer can take a comfortable stance in observing the image of an object to be photographed from the back of the camera It should be noted that the arrangement of the Fresnel surface and the focusing surface may be the same surface as in the present embodiment, but even if they are made to be different surfaces by using another member, there is nothing changed in the function of the invention. Yet, it is desirable that the upper face of the roof prism is left to be of either one of the Fresnel and mat forms, because ghost in the eye-level portion can be removed.

Figure 4:
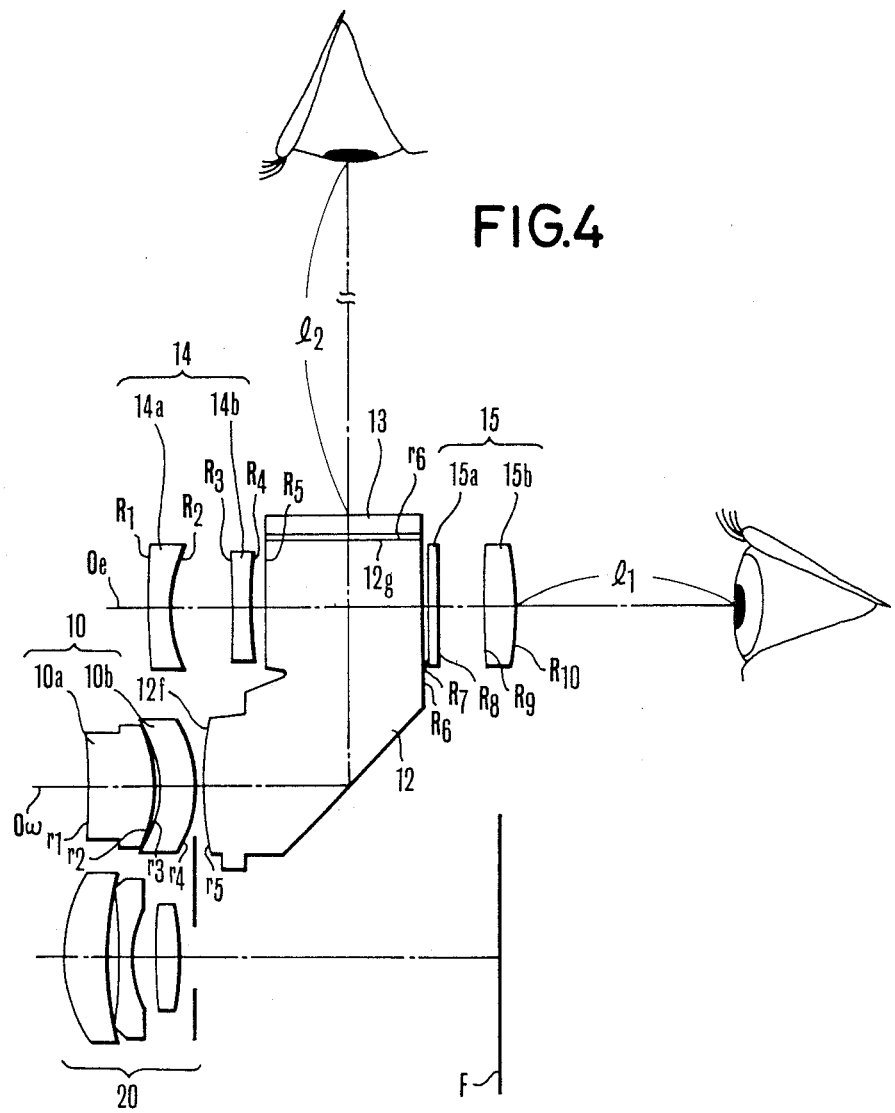
FIG. 4 is a sectional view of a second embodiment of the finder device according to the invention.

Numerical examples of the optics shown in FIGS. 4 and 5 are given below. In these specific embodiments, ri or Ri is the radius of curvature of the i-th lens surface counting from the front, Di is the i-th lens thickness or air separation counting from the front, and ni is the refractive index of the glass of the i-th lens element counting from the front.

| Numerical Example (FIG. 4): | | | | | |
|---|---|---|---|---|---|
| Waist-Level Part: | | | | | |
| r 1 | −49.70 | D 1 | 5.40 | n 1 | 1.49171 |
| r 2 | −11.40 | D 2 | 0.50 | | |
| r 3 | −8.60 | D 3 | 2.90 | n 2 | 1.49171 |
| r 4 | −10.20 | D 4 | 0.50 | | |
| r 5 | 27.60 | D 5 | 23.20 | n 3 | 1.49171 |
| r 6 | Roof Prism Fresnel Surface | | | | |
| Eye-Level Part: | | | | | |
| R 1 | 981.50 | D 1 | 1.90 | n 1 | 1.49171 |
| R 2 | 13.54 | D 2 | 3.40 | | |
| R 3 | 140.00 | D 3 | 1.80 | n 2 | 1.58347 |
| R 4 | 39.74 | D 4 | 1.70 | | |
| R 5 | ∞ | D 5 | 13.20 | n 3 | 1.49171 |
| R 6 | ∞ | D 6 | 0.50 | | |
| R 7 | ∞ | D 7 | 0.70 | n 4 | 1.52300 |
| R 8 | ∞ | D 8 | 4.00 | | |
| R 9 | 131.00 | D 9 | 2.80 | n 5 | 1.49171 |
| R 10 | −24.90 | | | | |
| Numerical Example (FIG. 5): | | | | | |
| Waist-Level Part: | | | | | |
| r 1 | −1916.0 | D 1 | 11.50 | n 1 | 1.50137 |
| r 2 | −16.65 | D 2 | 0.50 | | |
| r 3 | 34.73 | D 5 | 31.00 | n 2 | 1.50137 |
| r 4 | Roof Prism Fresnel Surface | | | | |
| Eye-Level Part: | | | | | |
| R 1 | 438.50 | D 1 | 1.90 | n 1 | 1.50137 |
| R 2 | 13.68 | D 2 | 3.00 | | |
| R 3 | 122.42 | D 3 | 1.80 | n 2 | 1.50137 |
| R 4 | 40.00 | D 4 | 1.30 | | |
| R 5 | ∞ | D 5 | 14.00 | n 3 | 1.50137 |
| R 6 | ∞ | D 6 | 0.50 | | |
| R 7 | ∞ | D 7 | 0.70 | n 4 | 1.52300 |
| R 8 | ∞ | D 8 | 4.00 | | |
| R 9 | 352.60 | D 9 | 2.80 | n 5 | 1.50137 |
| R 10 | −23.64 | | | | |

Though, in the above-described embodiments, the angle the ridge line 12e of the roofs makes with the optical axis Ow of the objective lens unit 10 is made to be 45° so that the optical axis Ow of the objective lens unit 10 is bent 90° upward, it is not necessarily 90°, and another angle may be used.

Here, when it is made smaller than 45°, the angle at which the photographer looks to the finder falls in between the waist level and the eye level. Though it is favored on angle, but the size of the roof prism 12 is increased. Therefore, it is desirable that the inclination of the ridge line 12e of the roofs to the optical axis Ow of the objective lens unit 10 is made to be not less than 10°. Also, it is desirable that the condenser lens 13 is positioned in the neighborhood of the image surface of the objective lens unit 10, for the purpose of minimizing the size of the condenser lens. Yet, by varying the relative position of the condenser lens 13 to the image surface, the viewfield range, viewfield magnification, can be varied in the waist level.

Also, this condenser lens has its arrangement made so that when observing at the waist level, the photographer can take a comfortable stance. Specifically, the distance $l_2$ from the condenser lens 13 to the eye point is made to become $l_2 > 100$ mm, more preferably, $l_2 > 250$ mm. And, for this purpose, the powers of the Fresnel lens surfaces are so determined that with the aperture of the objective lens as the stop, the point at which the principal ray of light after being refracted by these surfaces intersects the optical axis satisfies the condition for this distance.

Figure 6:
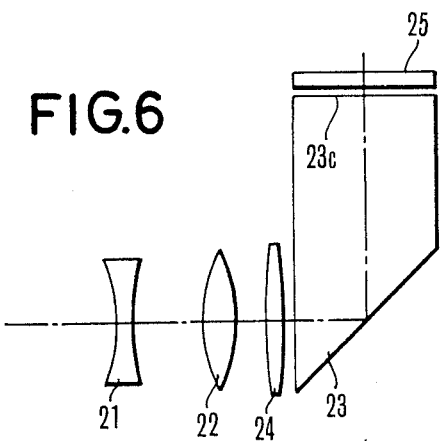
FIG. 6 is a sectional view of a fourth embodiment of the finder device according to the invention.
Figure 6:
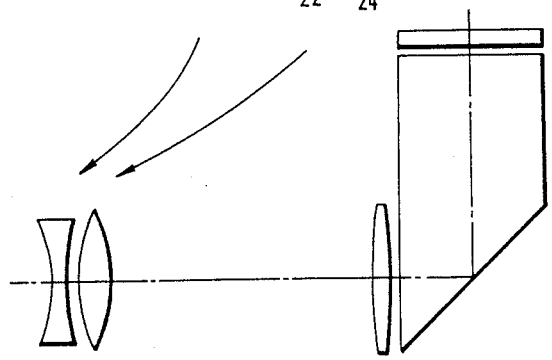

Next, another embodiment in which a magnification varying function is given to the objective lens is shown in FIG. 6. In the figure, 21 is a first lens unit of negative power, 22 is a second lens unit of positive power, and 24 is an image forming lens unit, the objective lens having a positive refractive power as a whole. 23 is a roof prism having roof faces, 25 is a Fresnel lens which performs the light collecting function.

In this arrangement, an image formed by the first lens unit 21 and the second lens unit 22 is laterally inverted by the roof faces, and focuses as an erect non-reverse image on the upper face 23c of the roof prism.

Here, by decreasing the air separation between the first and second lens units 21 and 22, the magnification is varied from the wide angle side to the telephoto side. In such a manner the viewfield range is made variable. It should be noted that by making negative the refractive power of the first lens unit 21 and positive the refractive power of the second lens unit 22, the objective lens system is made to obtain a long a back focal distance that the roof prism can be arranged in the rear of the objective lens system, leaving a margin.

A numerical example is shown below, where Ri is the radius of curvature of the i-th lens surface counting from the front, Di is the i-th lens thickness or air separation counting from the front, and ni is the refractive index of the glass of the i-th lens element counting from the front.

Numerical Example (FIG. 6):

| | | |
|---|---|---|
| R 1 = −17.92 | D 1 = 1.64 | n 1 = 1.491710 |
| R 2 = 34.86 | D 2 = 8.62 − 1.36 | |
| R 3 = 20.26 | D 3 = 3.82 | n 2 = 1.491710 |
| R 4 = −17.99 | D 4 = 3.28 − 30.93 | |
| R 5 = 52.37 | D 5 = 2.18 | n 3 = 1.491710 |
| R 6 = −102.50 | D 6 = 1.09 | |
| R 7 = ∞ | D 7 = 35.00 | n 4 = 1.491710 |
| R 8 = ∞ | | |

Of these lens surfaces, the R4 and R6 are aspheric surfaces expressed by the following equation:

$$X = (h^2/R)/(1-(h/R)^2)^{\frac{1}{2}}) + Ah^2 + Bh^4 + Ch^6 + Dh^8 + Eh^{10}$$

where h is the height of the surface from the optical axis, and X is the displacement from the vertex.

The values of each of the aspheric coefficients for the surfaces R4 and R6

| Surface | R | A | B | C | D | E |
|---|---|---|---|---|---|---|
| R4 | −17.99 | 0 | 3.81 × $10^{-5}$ | 2.12 × $10^{-7}$ | 1.65 × $10^{-9}$ | 1.08 × $10^{-10}$ |
| R6 | −102.50 | 0 | 6.46 × $10^{-5}$ | 1.57 × $10^{-7}$ | 0 | 0 |

Figure 7A:
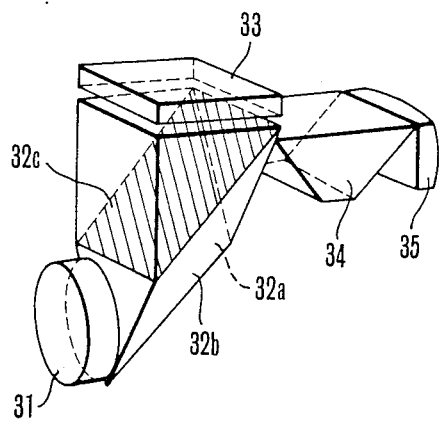
FIGS. 7(A) and 7(b) are views of a fifth embodiment of the finder device according to the invention.
Figure 7B:
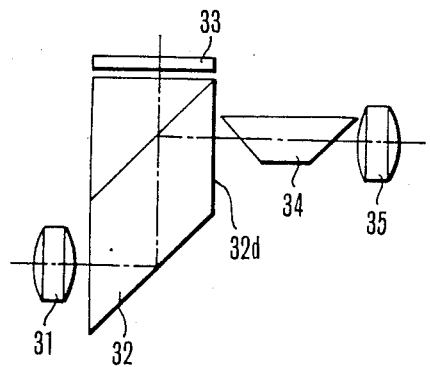

Next, another embodiment in which one objective lens is used for the eye-level and waist-level systems is shown in FIG. 7(A) and 7(B).

FIG. 7(A) is a perspective view of a finder system concerning the present embodiment, and FIG. 7(B) is its side elevational view. The finder system comprises an objective lens unit 31 having a positive refractive power, a roof prism 32 having roof faces 32a and 32b and a half mirror 32c, a Fresnel lens 33 of which one surface is in the matted form, a Dove prism 34 for vertically erecting the eye-level image, and an eyepiece lens unit 35 for use in observation at the eye level.

The light that has entered the objective lens unit 31 is horizontally inverted by the roof prism 32, and partly reflected, partly transmitted by the half reflection mirror 32c.

The transmitted light focuses an image on the mat surface of the Fresnel plate 33. By the function of the Fresnel lens, the image is made easy to observe with a high efficiency when at the waist level, despite a relatively long distance of the eye point from the Fresnel surface.

Also, the reflected light focuses an image which is inverted only in the vertical direction near the face 32d. This image is then turned upside down by using the Dove prism 34 so that the photographer looking through the eyepiece lens unit 35 can observe an erect non-reverse image.

For this case, it is possible to set the eye point at an appropriate value of around 13 to 20 mm to the eye-level finder by using the eyepiece lens unit 35 to enlarge the image.

It should be noted that 32c is not necessarily a half reflection mirror, and may be an area-divided pattern mirror.

Figure 8A:
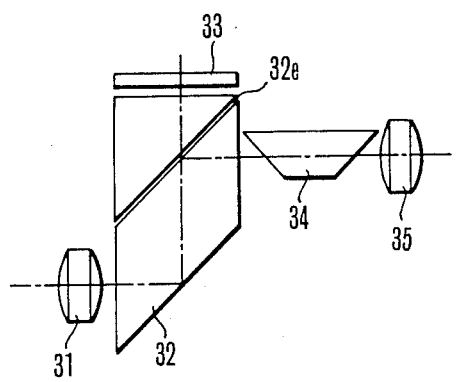
FIGS. 8(A) and 8(B) are sectional views of a sixth embodiment of the finder device according to the invention.
Figure 8B:
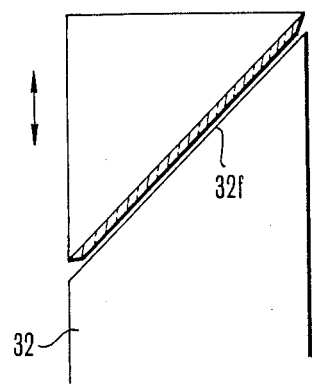

In the embodiment described just above, the waist level and the eye level viewing are enabled at once with the entering light beam being divided, a light-permeable soft member in the form of a thin plate may otherwise be introduced in a space indicated at 32e of FIG. 8(A), being arranged upon deformation to change over between the eye-level and waist-level modes, so that a sufficiently bright image can be observed in each mode.

That is, when this soft member is separated away from a plane represented by 32f, the entering light beam at the objective lens unit 31 is totally reflected from this surface 32f, thus all reaching the eye-level portion. Next, when the prism 32 is pushed at the upper portion to deform this soft member to an intimate contact with the surface 32f, that total reflection no longer takes place, permitting the light beam to pass across this surface to reach the waist level portion.

By such an operation, changing over between the eye-level and waist-level portions is possible.

Figure 9:
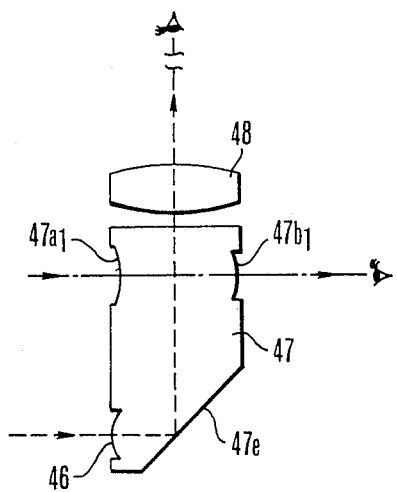
FIG. 9 is a sectional view of a seventh embodiment of the finder device according to the invention.

Next, another embodiment in which the eye-level finder system and the waist-level finder system both are all constructed in unison with the roof prism is explained on the basis of FIG. 9.

A room prism is constructed with an eye-level entrance portion $47a_1$ made to be a concave surface toward the front and an eye-level exit portion made to be a convex surface $47b_1$ toward the eyepoint side, thus constituting an eye-level finder system, and with a lens surface 46 formed therein to a convex shape toward the object side.

According to the present embodiment, it can be simply manufactured by the mold production technique, etc. Reference numeral 48 indicates a condenser lens. It should be noted that the condenser lens 48 if formed also as a unit with the prism 47 becomes simpler.

Next described is an eighth embodiment of the invention which, particularly when at the waist level, enables the user to observe the image in a relatively comfortable posture.

Figure 10C:
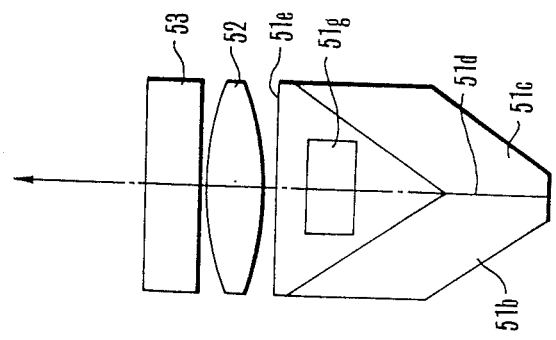
FIGS. 10(A), 10(B) and 10(C) are a perspective view, a sectional view and a back view, respectively, showing an eighth embodiment of the finder device according to the invention.
Figure 10B:
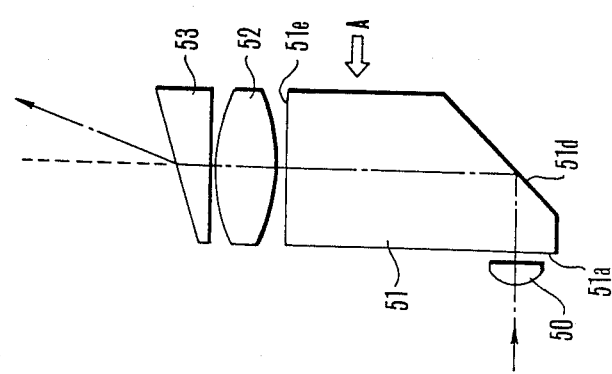
Figure 10A:
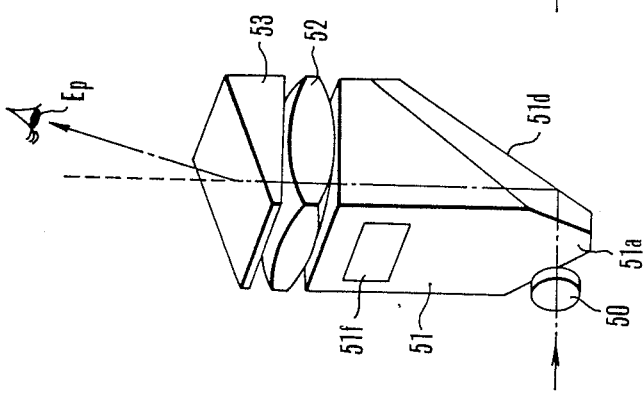

FIGS. 10(A), 10(B) and 10(C) are respectively a perspective view, a side sectional view and an elevational view looked from the side of arrow A of FIG. 10(B).

An objective lens 50 of positive power, a roof prism 51 having an entrance face 51a perpendicular to the optical axis of the objective lens 50 and roof faces 51b and 51c with their ridge line 51d making an angle of 45° with the optical axis of the objective lens 50 so that the optical axis of the objective lens 50 is reflected 90° upward to an exit face 51e thereof, a condenser lens 52 at or near an image surface of the objective lens 50, and a wedge prism 53 for refracting the optical axis to a desired eye point are arranged in this order from the direction in which light advances. According to such a construction and arrangement, a light beam entering through the objective lens 50 is caused by the roof prism 51 to interchange its right and left parts with each other, forming an erect non-reverse image on a plane near the condenser lens 52. And, the rays of light from the image are collected by the condenser lens 52, and the rays of light emerging from the condenser lens 52 are refracted by the wedge prism 53, and therefrom directed obliquely to the upper back as shown in FIG. 10(A). Thus, a waist level finder which enables the observer to look at the erect non-reverse image from the upper back of the finder. 51f and 51g represent an optical path of the finder for eye level.

Though this embodiment has been described using the reflection optical element having roof faces in the form of a prism, it may otherwise be formed to a roof type mirror assembly.

Though, in this embodiment, as the means for deviating the optical axis use has been made of the wedge prism 53, other forms of the deviating means may be employed as shown below.

Figure 11A:
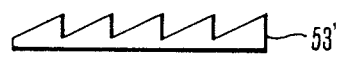
FIGS. 11(A) to 11(E) show the various modifications of the embodiment of FIGS. 10(A) to 10(C) in which an image can be viewed at the waist level position in a comfortable posture.

FIG. 11(A) shows an example of variation of the wedge prism 53 shown in FIGS. 10(A)–10(C) to a Fresnel wedge prism 52' with an advantage of reducing its thickness.

Figure 11B:
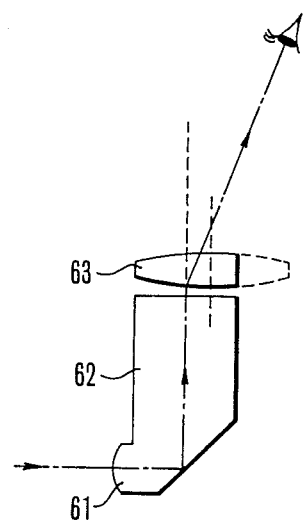

FIG. 11(B) shows another embodiment of the invention in which the optical axis of a condenser lens 63 is displaced from the bent optical axis of an objective lens 61 by a roof prism 62.

In other words, not only the light collecting function but also the light deviating function is made borne on the condenser lens 63 itself. When the optical axis of the condenser lens 63 is out of coincidence with the optical axis of the objective lens 61, the light beam after having passed through the condenser lens 63 directs itself obliquely. Therefore, no such deviating means as the wedge prism 53 of the above-described eighth embodiment is necessary, thereby giving an advantage of reducing the size of the finder.

Figure 11C:
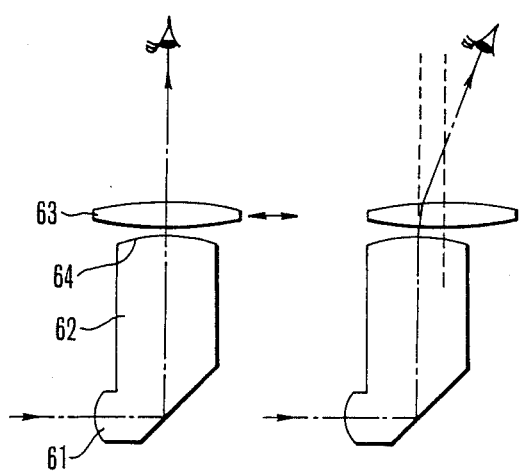

It should be noted that this condenser lens 63 may be arranged to move in a direction perpendicular to the optical axis thereof as shown in FIG. 11(C), thereby making it possible to vary the position of the eye point as desired.

Figure 11D:
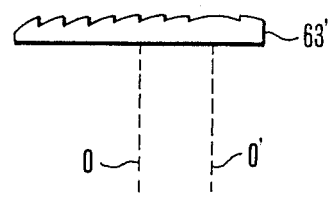

Next, FIG. 11(D) shows another embodiment which is to further reduce the size of the condenser lens 63 shown in FIG. 11(B). For this purpose, use is made of a Fresnel lens 63' whose optical axis 0' is disposed out of coincidence with the optical axis 0 of the objective lens 61.

Figure 11E:
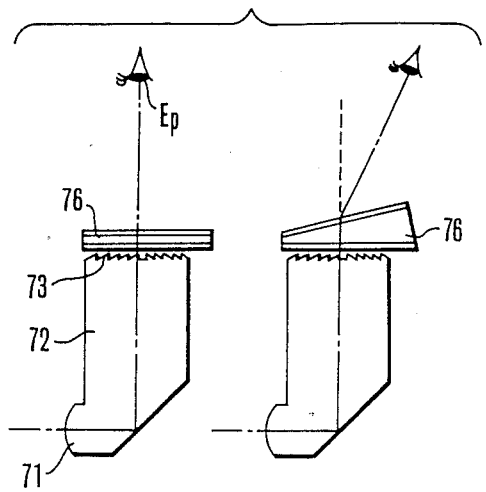

Next, FIG. 11(E) shows another embodiment in which instead of the wedge prism 53 shown in FIGS. 10(A)–10(C), use is made of a variable vertical angle prism 76. As the vertical angle is arbitrarily varied, the light beam is directed to the desired position of the eye point. The light collecting function is performed by a Fresnel lens 73 formed as a unit with the prism 72.

A further example of variation is that the objective lens may be constructed in the form of a Fresnel lens. Also, though in the above-described embodiments the condenser lens, the objective lens the wedge prism, etc. are constructed in the separate form from the roof prism, they may otherwise be constructed in the unified form, as a matter of course.

What is claimed is:

1. A finder device comprising:
   a first lens means for waist level viewing having a positive refractive power;
   a second lens means for eye level viewing; and
   a prismatic unit having roof faces with a crest line formed therebetween for reflecting a first light beam passed through said first lens means, and a region permitting a second light beam passed through said second lens means to transmit thereacross.

2. A finder device according to claim 1, further comprising a condenser lens unit positioned near a position of an image formed by said first lens means.

3. A finder device according to claim 2, wherein said condenser leans unit is a Fresnel lens.

4. A finder device according to claim 1, wherein said second light beam transmits unreflected.

5. A finder device according to claim 1, wherein said first lens means and said second lens means are constructed integrally with said prismatic unit.

6. A finder device according to claim 1, wherein said second lens means is a unit forming a finder optical system of the Albada type.

7. A finder device according to claim 1, wherein said prismatic unit has a lens face of a predetermined curvature radius on an objective side.

8. A finder device according to claim 1, wherein sid first lens means further comprises a lens which moves during zooming.

9. A finder device comprising:
   an objective lens unit for forming an image and being suitable for use at a user's waist level having a positive refractive power;
   prismatic optical means having roof faces having a crest line formed therebetween for reflecting a light beam emerging from said objective lens means; and
   a condenser lens means for directing the light beam directly to the user's eye and being positioned near an image surface of said objective lens means, wherein sid objective leans unit, said prismatic optical means and said condenser lens unit being arranged in the order in the advancing direction of the light flux, and wherein said device satisfying the condition of l>100 mm, wherein l represents the distance from said condenser leans unit to an eye point.

10. A finder device according to claim 9, wherein said optical means is a prism.

11. A finder device according to claim 10, further comprising a lens means for eye level viewing and wherein said optical means has a reflection surface for reflecting the light reflected from a roof face of sid prism to sid lens unit.

12. A finder device according to claim 9, wherein said condenser lens unit is a Fresnel lens.

* * * * *

UNITED STATES PATENT AND TRADEMARK OFFICE
CERTIFICATE OF CORRECTION

PATENT NO. : 4,957,356

DATED : September 18, 1990

INVENTOR(S) : Oizumi, et al.

It is certified that error appears in the above-identified patent and that said Letters Patent is hereby corrected as shown below:

ON TITLE PAGE:

AT 57:

Change "and" to --or--.

Change taking" to --having--.

COLUMN 2:

Line 52, change "has also" to --also has--.

COLUMN 3:

Line 64, change "camera" to --camera.--.

COLUMN 4:

Line 60, delete "but".

COLUMN 5:

Line 34, delete "a" (second occurrence).

Line 35, after "distance" insert --so--.

UNITED STATES PATENT AND TRADEMARK OFFICE
CERTIFICATE OF CORRECTION

PATENT NO. : 4,957,356

DATED : September 18, 1990

INVENTOR(S) : Oizumi, et al.

It is certified that error appears in the above-identified patent and that said Letters Patent is hereby corrected as shown below:

COLUMN 7:

Line 36, after "finder" insert --is realigned--.

Line 57, change "made borne on" to --borne by--.

COLUMN 8:

Line 19, change "objective lens" to --objective lens,--.

Line 65, change "sid" to --said--; and change "leans" to --lens--.

COLUMN 10:

Line 3, change "sid" to --said--.

Signed and Sealed this

Fourth Day of August, 1992

Attest:

DOUGLAS B. COMER

*Attesting Officer*　　　Acting Commissioner of Patents and Trademarks

UNITED STATES PATENT AND TRADEMARK OFFICE
CERTIFICATE OF CORRECTION

PATENT NO. : 4,957,356
DATED : September 18, 1990
INVENTOR(S) : Oizumi, et al

It is certified that error appears in the above-indentified patent and that said Letters Patent is hereby corrected as shown below:

Column 5:

Lines 57 and 58, change

"$X = (h^2/R)/(1-(h/R^2)^{\frac{1}{2}}) + Ah^2 + Bh^4 + Ch^6 + Dh^8 + Eh^{10}$"

to

--$X = (h^2/R)/(1+(1-(h/R)^2)^{\frac{1}{2}} + Ah^2 + Bh^4 + Ch^6 + Dh^8 + Eh^{10}$--.

Signed and Sealed this

Eleventh Day of January, 1994

Attest:

BRUCE LEHMAN

*Attesting Officer*  *Commissioner of Patents and Trademarks*